United States Patent
Bunin et al.

(10) Patent No.: US 12,272,490 B2
(45) Date of Patent: Apr. 8, 2025

(54) MAGNETICALLY CONTROLLABLE CHOKE COIL HAVING CENTRAL CONNECTION

(71) Applicant: Siemens Energy Global GmbH & Co. KG, Munich (DE)

(72) Inventors: Anatoliy Bunin, Stein (DE); Carsten Koczula, Nuremberg (DE); Matthias Küestermann, Nuremberg (DE); Thomas Manthe, Ueckermuende (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 344 days.

(21) Appl. No.: 17/297,070

(22) PCT Filed: Nov. 26, 2018

(86) PCT No.: PCT/EP2018/082577
§ 371 (c)(1),
(2) Date: May 26, 2021

(87) PCT Pub. No.: WO2020/108732
PCT Pub. Date: Jun. 4, 2020

(65) Prior Publication Data
US 2021/0407731 A1    Dec. 30, 2021

(51) Int. Cl.
*H01F 29/14*    (2006.01)
*H01F 27/24*    (2006.01)
(Continued)

(52) U.S. Cl.
CPC ........... *H01F 29/146* (2013.01); *H01F 27/24* (2013.01); *H01F 27/42* (2013.01); *H02J 3/1842* (2013.01); *H01F 2029/143* (2013.01)

(58) Field of Classification Search
CPC ........ H01F 27/24; H01F 29/146; H01F 27/42; H02J 3/1842
See application file for complete search history.

(56) References Cited

U.S. PATENT DOCUMENTS 5,617,447 A     4/1997  Tambe
10,056,886 B2 *  8/2018  Bunin ................... H02P 13/12
(Continued)

FOREIGN PATENT DOCUMENTS

CN    1133545 A    10/1996
CN    102891000 A    1/2013
(Continued)

*Primary Examiner* — Thienvu V Tran
*Assistant Examiner* — Yahveh Comas Torres
(74) *Attorney, Agent, or Firm* — Laurence A. Greenberg; Werner H. Stemer; Ralph E. Locher (57) ABSTRACT

A device for reactive power compensation in a high voltage network having at least one phase conductor, includes a high voltage connection for each phase conductor, first and second core sections of a closed magnet circuit, a first high voltage winding enclosing the first core section, a second high voltage winding enclosing the second core section and being connected parallel to the first high voltage winding, at least one saturation switching branch being configured to saturate at least one core section has controllable power semiconductor switches, and a control unit controls the power semiconductor switches for each high voltage connection. In order to avoid leakage field losses, at least one high voltage winding has a central connection and is connected at its winding ends to the saturation switching branch. The central connection is connected to the high voltage connection.

10 Claims, 4 Drawing Sheets

(51) Int. Cl.
*H01F 27/42* (2006.01)
*H02J 3/18* (2006.01)

(56) References Cited

U.S. PATENT DOCUMENTS 10,090,098 B2 * 10/2018 Hamberger ............. H01F 27/38
2017/0134011 A1    5/2017 Bunin et al.

FOREIGN PATENT DOCUMENTS

| CN | 106877352 A | 6/2017 | | |
|---|---|---|---|---|
| DE | 202012104399 U1 * | 2/2013 | ........... | H01F 27/263 |
| DE | 202013004706 U1 * | 8/2013 | ............. | H01F 27/42 |
| DE | 102012110969 A1 * | 3/2014 | ........... | H01F 27/263 |
| DE | 102014116846 A1 * | 5/2016 | ............... | G05F 1/32 |
| EP | 3168708 A1 | 5/2017 | | |
| SU | 1101967 A1 | 7/1984 | | |
| WO | 2015169692 A2 | 11/2015 | | |

\* cited by examiner

MAGNETICALLY CONTROLLABLE CHOKE COIL HAVING CENTRAL CONNECTION

BACKGROUND OF THE INVENTION

Field of the Invention

The invention relates to a device for reactive power compensation in a high-voltage network which has at least one phase conductor. The device has a high-voltage connection for each phase conductor. For each high-voltage connection, a first and a second core section which are part of a closed magnet circuit, a first high-voltage winding which encloses the first core section, a second high-voltage winding which encloses the second core section and is connected in parallel to the first high-voltage winding, at least one saturation switching branch which is set up to saturate at least one core section and has controllable power semiconductor switches, and a control unit for controlling the power semiconductor switches are, in turn, provided.

A device of this type is already known from EP 3 168 708 A1. A so called "Full Variable Shunt Reactor" (FVSR) is disclosed therein. The device previously known possesses two high-voltage windings connected in parallel to one another per phase which each enclose a core limb of a closed iron core and at their high-voltage end are connected to a phase conductor of a high-voltage network. The low-voltage sides of the high-voltage windings can either be connected to a suitably polarized converter or directly to a ground connection by means of a transistor switch. The converter is set up to generate a direct current in the high-voltage winding which is connected to it. In this case, the direct current is set in such a way that the core limb which is enclosed by the winding is operated in a desired saturation state. In this saturation state, the core material has a very low magnetic permeability, for example, whereby the magnetic resistance of the winding is increased and its inductance reduced. The saturation of said core sections is dependent on polarization, such that an alternating current which flows over the windings substantially only flows over one of the two high-voltage windings depending on its polarization. In this way, a positive alternating current flows over the first high-voltage winding while a negative alternating current flows over the second high-voltage winding down to ground, for example. If the current is only operated via a high-voltage winding, the respective other winding, through which the alternating current is not currently flowing, can be supplied with a direct current, in order to saturate the core limb enclosed by it to the desired extent.

Magnetically controlled choke coils are further known from DE 20 2013 004 706 U1 and DE 10 2012 110 969.

The disadvantage of the device previously known is that the high-voltage windings which are at a high-voltage potential during operation must have a large distance from the core which is at ground potential in order to provide the required dielectric strength. This large distance results in the stray field generated by the high-voltage winding becoming stronger and penetrating parts of the active part, such as the press frame, the feedthroughs, the tank or the outbound connections, for example, whereby undesired losses occur and said parts are heated.

SUMMARY OF THE INVENTION

The object of the invention is to provide a device of the type specified at the outset which has lower stray field losses.

The invention achieves this object by at least one high-voltage winding having a central connection and being connected at its winding end to the saturation switching branch and, via the central connection, to the high-voltage connection.

The device according to the invention has at least one high-voltage winding with a central connection. The central connection is connected to the high-voltage connection allocated in each case. Both high-voltage windings which are allocated to the same high-voltage connection are preferably provided with a central connection and are connected to the high-voltage connection via this central connection. All high-voltage windings of the device according to the invention are therefore connected to the high-voltage connection via their central connection. Conversely, the winding ends are connected to the saturation switching branch. The winding ends, which are facing the upper or lower yoke of the core, are thus at a lower electrical potential than in the case of a similar device according to the prior art. The distance $X_o$ and $X_u$ of the ends of the or each of the high-voltage windings from the upper or lower yoke can therefore be reduced. This reduces the magnetic stray field and consequently reduces the stray field losses.

Moreover, the device according to the invention is also compact and therefore lighter than a device previously known which is designed for the same powers and operating voltages.

The term "central connection" is indeed known to the person skilled in the art. However, for the sake of clarification, it should be mentioned that a central connection is intended to be understood to mean here that a winding which extends in the longitudinal direction and in this longitudinal direction has superimposed, helically wound windings, winding packs or coils is equipped with, at a winding, winding pack or coil which is centered in the longitudinal direction, a connection which is here referred to as a central connection. However, within the scope of the invention, the central winding, the central winding pack or the central coil which is connected to the central connection or forms it does not have to be precisely in the longitudinal center of the high-voltage winding. In fact, it is possible to deviate from this within the scope of the invention.

The first and the second core section are preferably connected to one another via an upper and a lower yoke, wherein the distances $X_o$ and $X_u$ between the upper and lower yoke and the first or second winding end of the high-voltage winding(s) equipped with a central connection are in the range of 1 to 20 cm. This range has proven to be particularly favorable for the distances.

According to one preferred variant of the invention, each high-voltage winding and each saturation switching branch is arranged in a tank filled with an insulating fluid. According to one variant, high-voltage windings and saturation switching branches are arranged in the same tank. However, within the scope of the invention, it is also possible for the high-voltage windings and the power electronics of the saturation switching branch to be arranged in different tanks or housings. In this case, both housings are filled with an insulating fluid, wherein feedthroughs are provided in order to enable the electrical connection of the components which are arranged in the tank to one another. The insulating fluid can be a mineral oil, an ester, or the like, for example. Provision can be made for different insulating fluids in different tanks. However, the insulating fluid is preferably the same in all tanks. Deviating from this, the insulating fluid can also be designed as an inert gas.

Each saturation switching branch preferably possesses at least one two-pole submodule with a bridge circuit which possesses power semiconductor switches and a direct voltage source, so that the direct voltage source can either be connected in series to at least one high-voltage winding or bridged depending on the control of the power semiconductor switches. The direct voltage source then provides the necessary voltages and direct currents for saturating the core limb of the high-voltage winding in the case of suitable control of the power semiconductor switches.

Each submodule is preferably designed as a full bridge circuit which has a first series connection branch and a second series connection branch which are each connected in parallel to the direct voltage source. Each series connection branch has a series connection made up of two power semiconductor switches, wherein the potential point between the power semiconductor switches of the first series connection branch is connected to a first connecting terminal of the submodule and the potential point between the power semiconductor switches of the second series connection branch is connected to the second connecting terminal of the submodule. Full bridge circuits enable a polarization reversal at the connecting terminals which is not possible with a so called half bridge circuit, which merely has a parallel branch with two power semiconductor switches.

Each power semiconductor switch is preferably an IGBT with a free-wheeling diode connected in parallel in the opposite direction, a so called GTO or a transistor switch. Within the scope of the invention, it is advantageous that each power semiconductor switch can be transferred both from its interrupter position, in which a current flow over the power semiconductor switch is not possible, to its passage position or vice versa, in which a current flow over the power semiconductor switch is enabled. Power semiconductor switches of this type are also referred to as disconnectable power semiconductor switches which can even interrupt a short-circuit current which flows over them if suitable measures have been taken to dissipate the resulting energies.

Each direct voltage source is preferably an energy storage device. An energy storage device can be electrical energy storage devices which are preferably unipolar, for example. It is therefore possible for energy storage devices to be capacitors, supercapacitors, superconducting coils, battery accumulators, supercaps or the like, for example. The listed or other energy storage devices may appear individually in a submodule or else a plurality of them are connected in series. This series and/or parallel connection as a whole is referred to using the term "energy storage device" within the scope of the invention present here.

The energy storage device is advantageously connected to a charging unit for charging the energy storage device. The energy storage device can preferably be connected to a supply network. This advantageously takes place via a charging unit which can in principle be configured as desired within the scope of the invention. However, it is essential that energy can be extracted from the supply network via the charging unit and can be stored in the energy storage device. This energy then enables the current flow for saturating the respective high-voltage winding.

Stabilizing windings are advantageously provided which are coupled inductively to the high-voltage windings, wherein the auxiliary windings are connected to at least one capacitively acting component. Within the scope of the invention, the stabilizing windings are coupled inductively to at least one of the high-voltage windings. In this case, the stabilizing windings are interconnected with a capacitively acting component. The term "interconnected" means that each capacitively acting component is galvanically connected to at least one of the stabilizing windings either directly or via an electrical component, such as a switch unit, for example. The capacitive component, for example a capacitor or a "Flexible AC Transmission System" (FACTS) component which is equipped with capacitors, such as a "Static Synchronous Compensator" (STATCOM), for example, can therefore have an influence on the degree and direction of the reactive power compensation. In this case, the control unit can control the power semiconductor switches of the FVSR in such a way that the inductive effect of the high-voltage winding is almost completely cut back in the case of the reactive power compensation, so that only the capacitive component exhibits its effect and contributes to an overall capacitive reactive power compensation. Deviating from this, the control unit can ensure that the inductive effect of the high-voltage winding comes into full effect, such that the effect of the capacitive component is superimposed, such that an inductive reactive power compensation takes place overall. The capacitive component is advantageously a capacitor or a capacitor battery.

Further advantageous configurations and advantages of the invention are the subject matter of the subsequent description of exemplary embodiments of the invention with reference to the figures of the drawings, wherein the same reference numbers refer to components which have an identical effect.

DETAILED DESCRIPTION OF THE INVENTION

Figure 1:
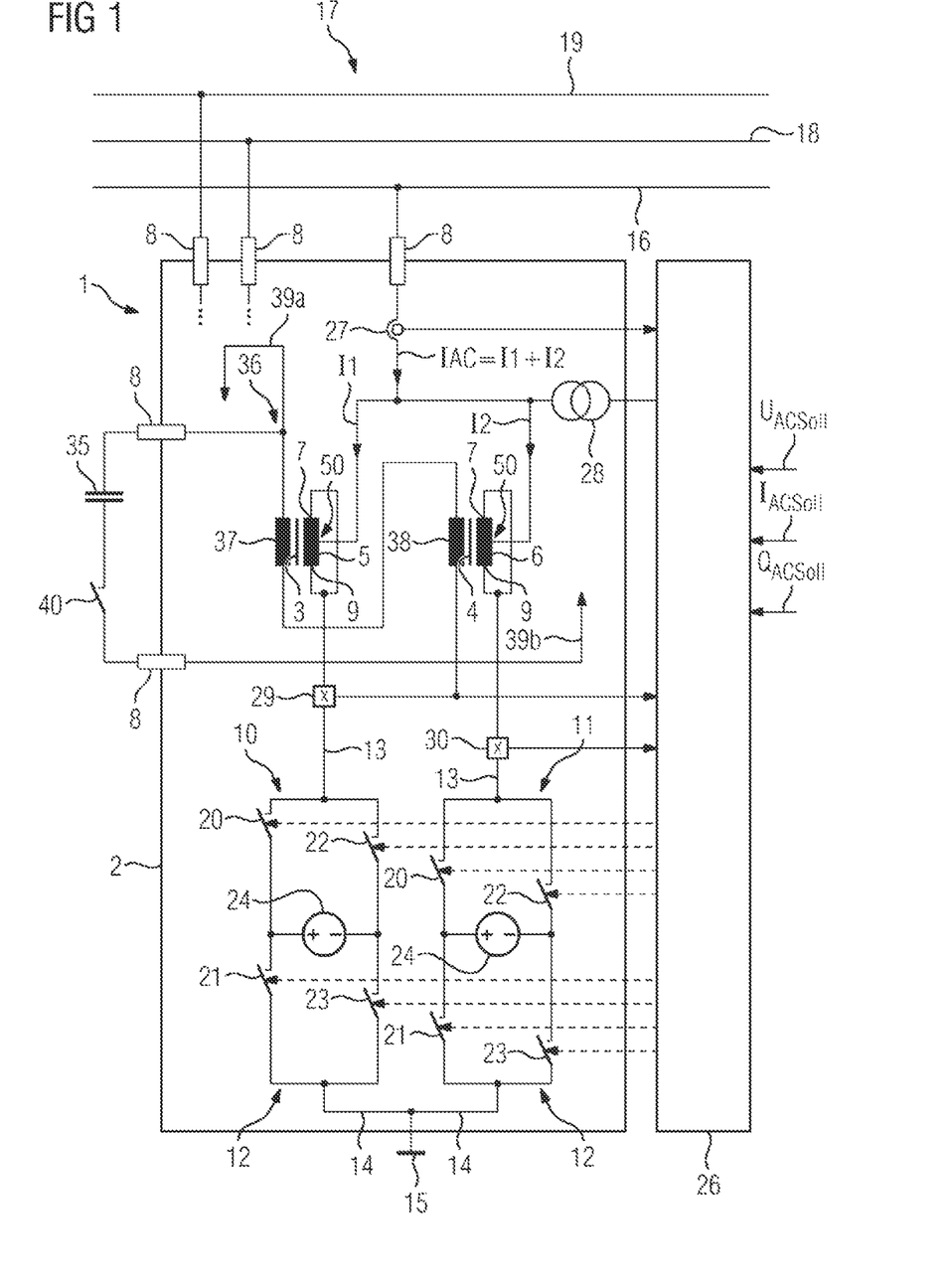
FIG. 1 shows an exemplary embodiment of the device according to the invention.

FIG. 1 shows an exemplary embodiment of the device 1 according to the invention which has a tank 2 filled with an insulating fluid. The insulating fluid can be mineral oils but also ester liquids or the like. On the one hand, the insulating fluid provides the necessary dielectric strength for components of the device 1 which are at a high-voltage potential, relative to the tank 2 at ground potential. Moreover, the insulating fluid serves to cool the components which have generated heat during operation.

A core is arranged inside the tank 2, which core is composed of a magnetizable material, here iron sheets resting flat against one another, and forms a first core limb 3 as well as a second core limb 4 as core sections. The first core limb 3 is enclosed by a first high-voltage winding 5. The second core limb 4 is enclosed by a second high-voltage winding 6. For forming a closed magnetic or iron circuit, yokes which are not represented figuratively are used which extend from the upper end of the first core limb 3 to the upper end of the second core limb 4 as well as from the lower end of the core limb 3 to the lower end of the core limb 4. FIG. 1 shows the wound core limbs 3 and 4 for one phase. For the two other phases of the high-voltage network, two further wound core limbs which are not represented are arranged in the tank 2 respectively and are connected to one another via the yokes. Moreover, two reflow limbs, also not represented figuratively, are provided which are not enclosed by a winding and extend right and left parallel to the core limbs 3 or 4. In other words, a so called 6/2 core is provided in the case of the single-phase embodiment of the FVSR described in FIG. 1. Deviating from this, the device 1 according to the invention can have a tank 2 for each phase. There would then be a 2/2 core with two wound core limbs 3 and 4 as well as 2 non-wound reflow limbs arranged in each single-phase tank 2.

The first high-voltage winding 5 and the second high-voltage winding 6 each have a first end 7 and a second end 9. Furthermore, each high-voltage winding 5 and 6 is equipped with a central connection 50. Furthermore, high-voltage connections 8 can be identified, wherein a high-voltage connection is provided for each phase. If the device 1 is arranged in a tank 2 filled with insulating fluid, the high-voltage connection 8 is designed as a feedthrough, for example. The feedthrough passes through the tank wall and is equipped with an open-air connection at its free end which is arranged outside the vessel. The open-air connection which is not represented figuratively is used to connect an air insulated conductor. At its first and second ends 7, 9 which are connected to one another, the first high-voltage winding 5 and the second high-voltage winding 6 are connected to a saturation switching branch 10 or 11, wherein each saturation switching branch 10, 11 has a two-pole submodule 12 which is connected to the respective high-voltage winding 5 or 6 with a first connecting terminal 13 and to a common potential point 15 with a second connecting terminal 14. The potential point 15 is grounded in the exemplary embodiment shown. In other words, the high-voltage windings 5 and 6 are connected in parallel to one another or at least can be connected.

The high-voltage windings 5 and 6 are connected to a phase conductor 16 of a high-voltage network 17 via the high-voltage connection 8, wherein the high-voltage network 17 has two further phase conductors 18 and 19 which are each again connected to two high-voltage windings and two saturation switching branches via a high-voltage connection 8. In other words, the device 1 has an identical structure for each phase 16, 18, 19 of the high-voltage network 17, wherein for the sake of clarity, only the structure for one phase conductor 16 is shown here.

It is essential for the full variable shunt reactor (FVSR) shown here that each saturation switching branch 10 or 11 has a two-pole submodule 12 which possesses a bridge circuit made up of power semiconductor switches 20, 21, 22 and 23 and a direct voltage source 24 which is preferably designed to be unipolar and therefore has a fixed positive terminal and a fixed negative terminal.

Within the scope of the invention, the bridge circuit can be a half bridge or a full bridge. In FIG. 1, each submodule possesses a full bridge with four power semiconductor switches 20, 21, 22, 23. A half bridge only comprises two power semiconductor switches. In order to suitably control the four power semiconductor switches 20, 21, 22 and 23, a control unit 26 is provided which can be supplied on the input side with nominal values for the voltage $UAC_{soll}$, the alternating current $IAC_{soll}$ and the reactive power $QAC_{soll}$. A current sensor 27 is used for detecting the alternating current IAC which flows from the phase conductor 16 to the high-voltage windings 5 and 6, wherein a voltage sensor 28 detects the voltage dropping on the high-voltage side of the high-voltage winding 5 and 6. The current sensor 27 and the voltage sensor 28 are connected to the control unit 26 via signal lines which are not represented figuratively. At the first end 9 of the high-voltage winding 5 or 6, sensors 29 and 30 can also be identified which are also connected to the control unit 26 via signal lines and detect currents which flow between the respective submodule 12 and the respective high-voltage winding 5 or 6.

The power semiconductor switches 20, 21, 22 and 23 of a submodule 12 can, by way of suitable control signals which are represented by dashed lines, be transferred by the control unit 26 from a disconnected position, in which a current flow over the power semiconductor switches is interrupted, to a pass-through position, in which a current flow over the power semiconductor switches is enabled, or vice versa from the pass-through position to the disconnected position.

The operating mode of the device 1 is as follows: if the current detected by the current sensor 27 or rather 28 or 29 is positive, the power semiconductor switches 22 and 23 of the saturation circuit 10 are closed. It is assumed at this point that the core limb 3 has been saturated previously by a direct current which flows from the submodule 12 of the first saturation switching branch to the high-voltage winding 5, so that for the positive half-wave of the alternating voltage, the alternating resistance of the high-voltage winding 5 is smaller than the alternating resistance of the high-voltage winding 6. Almost the entire alternating current IAC therefore flows over the current path, denoted by I1, down to ground. The power semiconductor switches 21 and 22 of the saturation switching branch 11 are therefore closed in the positive half-wave of the current, so that the direct voltage source 24 of the saturation circuit 11 drives a direct current which flows from the high-voltage winding 6 to ground 15. During the positive half-wave of the alternating voltage in the phase conductor 16, the second core limb 4 can thus be saturated in the desired manner.

Conversely, during the negative half-wave, in which the current measured by the sensor 27 or 30 is negative, the alternating current IAC substantially flows over the second high-voltage winding 6, such that a saturation direct current is generated by closing the power semiconductor switches 20 and 23 and opening the power semiconductor switches 21 and 22 of the submodule 12 of the first saturation switching branch 10, which saturation direct current flows from the submodule 12 to the first high-voltage winding 5. A current alternatively flows in the opposite direction by closing the power semiconductor switches 22 and 21. The desired saturation of the core limb 3 can be set by means of suitable switching.

Within the scope of the invention, it is essential that the ends or in other words the winding ends 7 or 9 of the high-voltage windings are not connected to the high-voltage connection 8 and are at a high-voltage potential during operation of the device 1 according to the invention. Within the scope of the invention, said ends 7, 9 are connected to one or each respective saturation switching branch 10, 11 which is connected to ground at its end facing away from the high-voltage winding. The ends 7, 9 are therefore at a lower electrical potential. The distance to the yoke of the core which is not represented can therefore be smaller than in the case of a similar device of the prior art. In this way, stray field losses are reduced.

Figure 2:
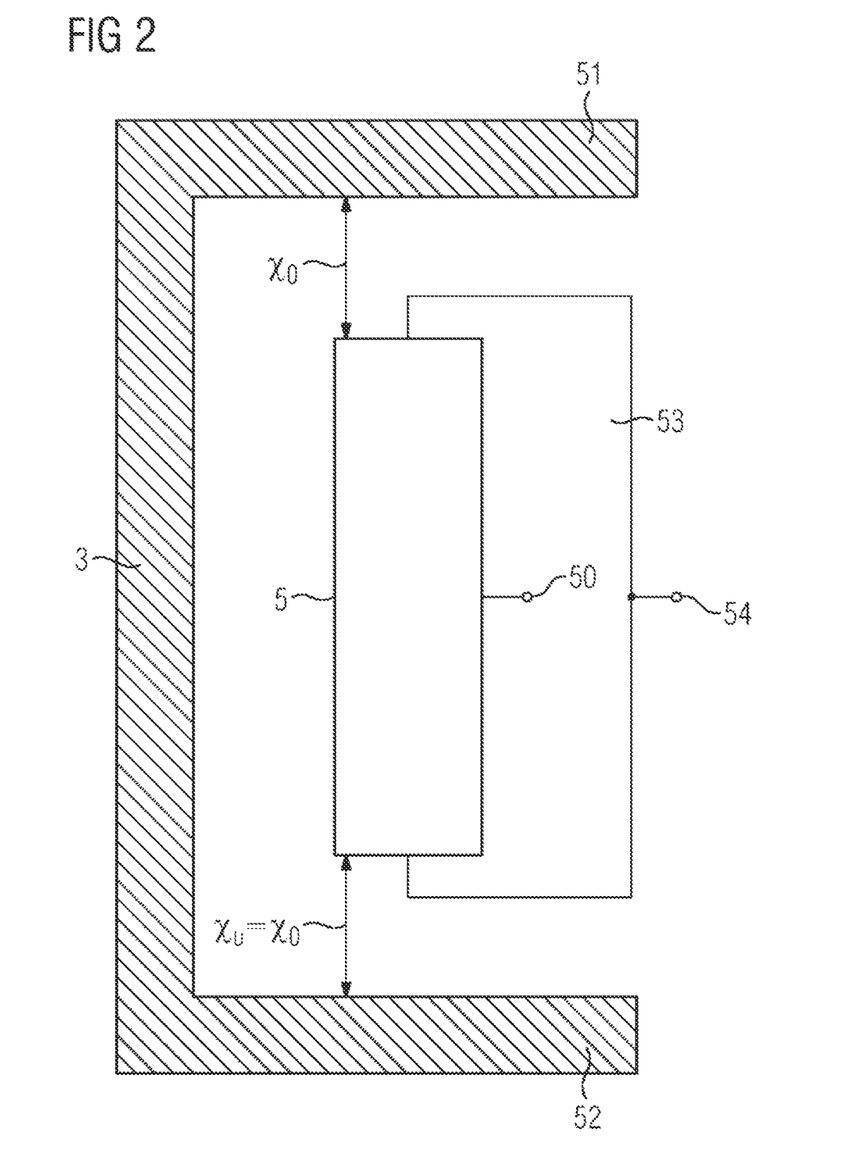
FIG. 2 shows one of the high-voltage windings with its allocated core sections of the device according to FIG. 1.

FIG. 2 illustrates the statements made previously and shows the first core limb 3 and the first high-voltage winding 5 with its two winding ends 7 and 9 as well as its central connection 50, which have already been explained here in relation to FIG. 1. The two ends 7, 9 are connected to one another via a connecting line 53 also shown in FIG. 1, wherein a connection 54 is used for connecting to a saturation switching branch. Moreover, FIG. 2 illustrates an upper yoke 51 and a lower yoke 52 of the core which are facing the first end 7 and the second end 9 of the high-voltage winding 5. Furthermore, the upper distance $X_o$ between the first end 7 of the high-voltage winding 5 and the upper yoke 51 as well as the lower distance $X_u$ between the second end 9 and the lower yoke 52 are illustrated. In the exemplary embodiment shown, said distances are the same.

Figure 3:
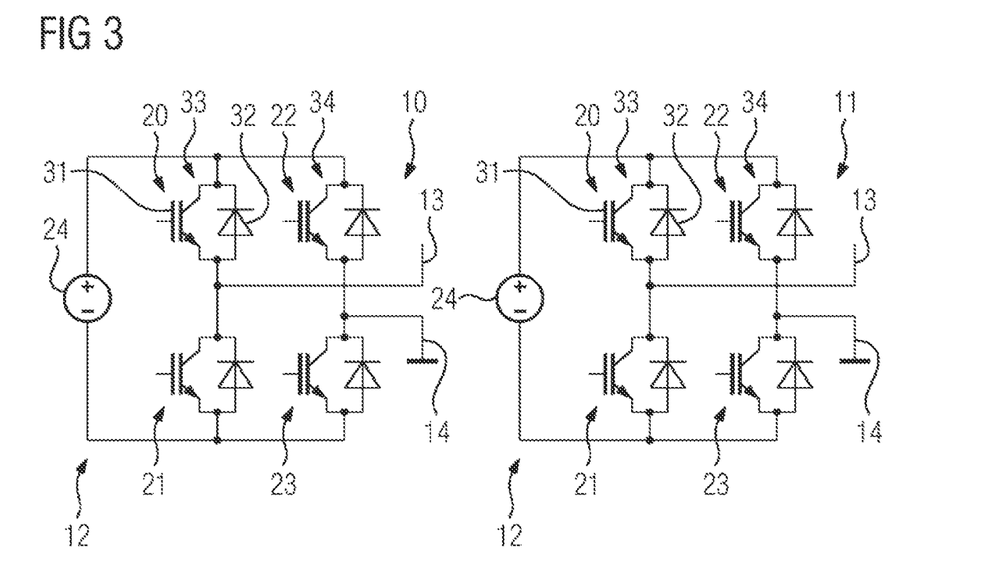
FIG. 3 shows the submodules of a saturation switching branch of the device according to FIG. 1 in greater detail and FIG. 4 shows a further exemplary embodiment of the invention in a schematic representation.

FIG. 3 shows the structure of the submodules 12 of the first and second saturation circuit 10, 11 in greater detail. It can be identified that the submodules 12 for both saturation switching branches 10 or 11 are constructed in an identical manner. It can be further identified that the power semiconductor switches 20, 21, 22, 23 comprise a so called IGBT 31 to which a free-wheeling diode 32 is connected in parallel in the opposite direction. The structure of an IGBT with a free-wheeling diode is known in principle, such that it is not necessary at this point to go into greater detail regarding its mode of operation. It is essential that the free-wheeling diode 22 is used for protecting the IGBTs against overvoltages in the reverse direction. In this case, the IGBT 31 and diode 32 are usually accommodated in a common switch housing. The IGBT 31 and free-wheeling diode 32 are both referred to as power semiconductors here.

Each submodule 12 is designed as a so called full bridge and comprises a first series connection branch 33 and a second series connection branch 34 made up of two series-connected power semiconductor switches 20, 21 or 22 and 23 in each case. The potential point between the power semiconductor switches 20, 21 of the first series connection branch 33 is connected to the first connecting terminal 13 and the potential point between the power semiconductor switches 22 and 23 of the second series connection branch 34 is connected to the connecting terminal 14 of the submodule 12.

So far, only the mode of operation for the device 1, which is shown in FIG. 1, has been clarified as a "Full Variable Shunt Reactor" (FVSR). Moreover, like the device shown in FIG. 1, it also possesses a capacitively acting component which is designed as a capacitor 35 in FIG. 1. The capacitor is connected in parallel to a stabilizing winding 36, wherein the stabilizing winding consists of two partial auxiliary windings 37 and 38 which are connected in series to one another. The partial auxiliary winding 37 is coupled inductively to the first high-voltage winding 5 and the second partial auxiliary winding 38 is coupled inductively to the second high-voltage winding 6. In this case, the high-voltage windings 5 or 6 and the respective partial auxiliary winding 37 or 38 are arranged concentrically to one another, wherein they enclose the same core section 3 or 4 of the otherwise not further clarified core.

FIG. 1 only illustrates a stabilizing winding 36 for the phase shown there. However, further stabilizing windings are provided in the tank 2 for the other phases, which stabilizing windings have an identical structure and are interconnected with the capacitor 35 in the same manner. In this case, the stabilizing windings 36 of the different phases are connected to one another in a delta connection. This delta connection is indicated by the arrows 39a or 39b. In the parallel branch of the stabilizing winding, in which the capacitor 35 is arranged, a switch 40 is further schematically represented which, in the exemplary embodiment shown, comprises two thyristors connected in parallel in the opposite direction. By means of the electronic switch 40, the capacitor 35 can be connected in parallel to the auxiliary winding 36 or the effect of the capacitively acting component 35 can be suppressed.

The capacitor 35 is represented in FIG. 1 as an individual capacitor which is arranged outside the tank 2. However, the capacitor comprises a number of capacitors which are arranged in series or in parallel to one another and can therefore also be referred to as a capacitor battery. In this case, the number of capacitors connected in parallel or in series depends on the respective requirements, wherein the capacitive effect can be increased or reduced.

The capacitor or in other words the capacitor battery 35 is arranged, like the switch, outside the tank 2. In order to enable an electrical connection between the stabilizing winding 36 which is arranged in the tank 2, suitable feedthroughs 8 are again provided, which enables a voltage-resistant feed through of the high-voltage line through the tank wall to ground potential.

Figure 4:
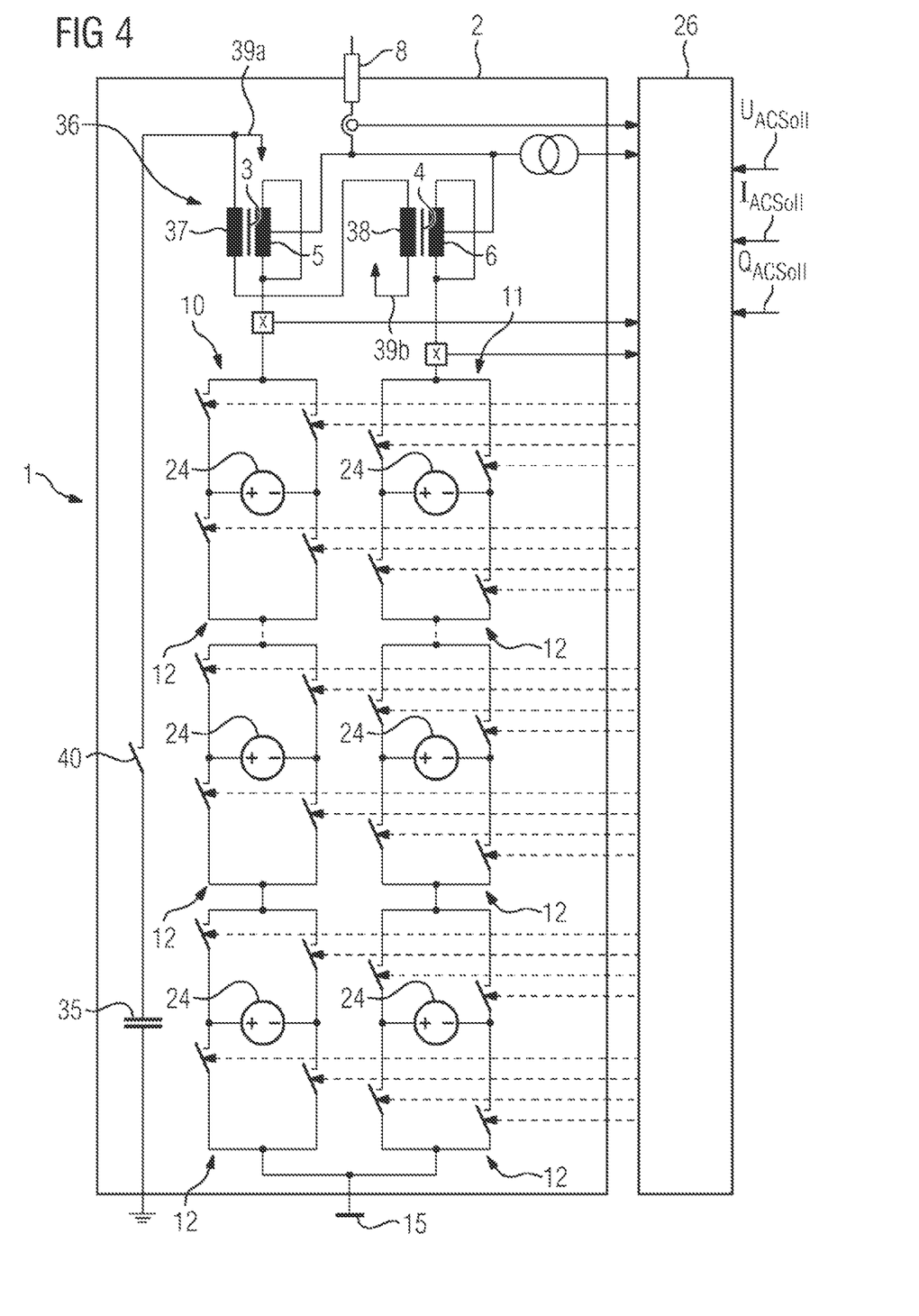

FIG. 4 shows one further exemplary embodiment of the device 1 according to the invention, wherein for the sake of clarity, only components for connecting to a phase of the high-voltage network 17 are shown. In the exemplary embodiment shown, each saturation branch 10 or 11 comprises a series connection made up of a plurality of submodules 12 which are controlled by the control unit 26 either all in an identical manner or in a different manner, so that the direct voltage direct current used for generating the saturation of the core limbs 3, 4 can be scaled according to the respective requirements. The auxiliary winding 36 again comprises 2 partial auxiliary windings 37 and 38 which are connected in series to one another, wherein the stabilizing winding 36 shown forms a delta connection with the stabilizing windings of the other phases, as indicated by the arrows 39a and 39b. In other words, at its end 39a, the partial auxiliary winding 37 is connected to a partial auxiliary winding of a second phase which is not shown here. The same applies to the partial auxiliary winding 38 which, at its end 39b, is connected to a partial auxiliary winding of a different phase, which is also not shown. The potential point between two stabilizing windings 36 of different phases is again connected to a terminal of a capacitor 35 or a capacitor battery via the switch 40, wherein each capacitor 35 is connected to ground potential 15 at its side which faces away from the stabilizing winding 36 and the switch 40. In this case, the capacitor 35 as well as the switch 40 are arranged inside the tank 2 of the device 1 in the exemplary embodiment of the invention represented in FIG. 4. In this way, a particularly space-efficient device 1 is provided. Moreover, the effort of running high-voltage lines out of the tank 2 is avoided compared with the exemplary embodiment shown in FIG. 1.

The invention claimed is:

1. A device for reactive power compensation in a high-voltage network having at least one phase conductor, the device comprising:
   at least one high-voltage connection configured to be connected to a respective phase conductor; and
   for each high-voltage connection:
   a first and a second core sections being part of a closed magnet circuit;
   at least one saturation switching branch configured to saturate at least one of said first and second core sections, said at least one saturation switching branch having controllable power semiconductor switches;
   a first high-voltage winding enclosing said first core section;
   a second high-voltage winding enclosing said second core section and being connected parallel to said first high-voltage winding;

at least one of said first and second high-voltage windings having a central connection connected to said high-voltage connection and winding ends connected to said at least one saturation switching branch; and a control unit for controlling said power semiconductor switches.

2. The device according to claim 1, which further comprises:
an upper and a lower yoke interconnecting said first and second core sections;
said winding ends of at least one of said high-voltage windings having a central connection being first and second winding ends; and
said first and second yokes each being spaced apart from a respective one of said first and second winding ends by a distance of 1 to 20 cm.

3. The device according to claim 1, which further comprises a tank filled with an insulating fluid, said high-voltage windings and said at least one saturation switching branch being disposed in said tank.

4. The device according to claim 1, wherein said at least one saturation switching branch has at least one two-pole submodule with a bridge circuit including said power semiconductor switches and a direct voltage source, said direct voltage source configured to be connected in series to said at least one high-voltage winding or bridged, depending on a control of said power semiconductor switches.

5. The device according to claim 4, wherein:
said at least one two-pole submodule includes first and second connecting terminals;
said at least one two-pole submodule forms a full bridge circuit having a first series connection branch and a second series connection branch each connected in parallel to said direct voltage source;
each series connection branch has a series connection formed of two of said power semiconductor switches;
said power semiconductor switches of said first series connection branch have a potential point therebetween being connected to said first connecting terminal of said at least one two-pole submodule; and
said power semiconductor switches of said second series connection branch have a potential point therebetween being connected to said second connecting terminal of said at least one two-pole submodule.

6. The device according to claim 4, wherein each of said power semiconductor switches includes an IGBT and a free-wheeling diode connected in parallel in an opposite direction, a GTO or a transistor switch.

7. The device according to claim 4, wherein said direct voltage source includes an energy storage device.

8. The device according to claim 7, wherein said energy storage device is configured to be connected to a supply network.

9. The device according to claim 1, which further comprises stabilizing windings coupled inductively to said high-voltage windings, and at least one capacitively acting component connected to said stabilizing windings.

10. The device according to claim 9, wherein said capacitively acting component includes capacitors.

* * * * *